United States Patent
Krishnaswamy et al.

(10) Patent No.: US 9,353,258 B2
(45) Date of Patent: May 31, 2016

(54) LOW GLASS TRANSITION POLYHYDROXYALKANOATES FOR MODIFICATION OF BIODEGRADABLE POLYMERS

(71) Applicant: Metabolix, Inc., Cambridge, MA (US)

(72) Inventors: Rajendra K. Krishnaswamy, Pittsburgh, PA (US); Johan van Walsem, Acton, MA (US); Oliver P. Peoples, Arlington, MA (US); Yossef Shabtai, Concord, MA (US); Allen R. Padwa, Worcester, MA (US)

(73) Assignee: Metabolix, Inc., Cambridge, MA (US)

( * ) Notice: Subject to any disclaimer, the term of this patent is extended or adjusted under 35 U.S.C. 154(b) by 0 days.

(21) Appl. No.: 14/406,135

(22) PCT Filed: Jun. 5, 2013

(86) PCT No.: PCT/US2013/044367
§ 371 (c)(1),
(2) Date: Dec. 5, 2014

(87) PCT Pub. No.: WO2013/184836
PCT Pub. Date: Dec. 12, 2013

(65) Prior Publication Data
US 2015/0147929 A1  May 28, 2015

Related U.S. Application Data

(60) Provisional application No. 61/788,090, filed on Mar. 15, 2013, provisional application No. 61/655,983, filed on Jun. 5, 2012.

(51) Int. Cl.
| | | |
|---|---|---|
| C08L 67/02 | (2006.01) | |
| C08J 3/24 | (2006.01) | |
| C08L 67/04 | (2006.01) | |
| C08J 5/18 | (2006.01) | |
| C08G 63/02 | (2006.01) | |

(52) U.S. Cl.
CPC .............. *C08L 67/02* (2013.01); *C08J 3/246* (2013.01); *C08J 5/18* (2013.01); *C08L 67/04* (2013.01); *C08J 2367/02* (2013.01); *C08J 2367/04* (2013.01); *C08J 2467/04* (2013.01); *C08L 2201/06* (2013.01); *C08L 2205/02* (2013.01); *C08L 2205/025* (2013.01); *C08L 2205/24* (2013.01); *C08L 2207/02* (2013.01); *Y10T 428/1334* (2015.01); *Y10T 442/3146* (2015.04); *Y10T 442/637* (2015.04)

(58) Field of Classification Search
CPC .............................. C08G 63/605; C08L 67/02
USPC .................................. 442/199, 361; 524/599
See application file for complete search history.

(56) References Cited

U.S. PATENT DOCUMENTS

| | | |
|---|---|---|
| 5,462,983 A | 10/1995 | Bloembergen et al. |
| 5,646,217 A | 7/1997 | Hammond |
| 5,756,651 A | 5/1998 | Chen et al. |
| 5,973,100 A | 10/1999 | Asrar et al. |
| 6,096,810 A | 8/2000 | Asrar et al. |
| 6,794,023 B1 | 9/2004 | Melik et al. |
| 7,579,413 B2 | 8/2009 | Mohanty et al. |
| 2002/0143136 A1 | 10/2002 | Noda et al. |
| 2004/0220355 A1 | 11/2004 | Whitehouse |
| 2005/0137356 A1 | 6/2005 | Hale et al. |
| 2006/0247387 A1 | 11/2006 | Mohanty et al. |
| 2007/0027247 A1 | 2/2007 | Ueda et al. |
| 2008/0027178 A1 | 1/2008 | Uradnisheck |
| 2009/0191371 A1 | 7/2009 | Uradnisheck |
| 2011/0135863 A1 | 6/2011 | Li et al. |
| 2011/0189414 A1 | 8/2011 | Whitehouse |
| 2012/0108743 A1 | 5/2012 | Krishnaswamy et al. |
| 2013/0065046 A1 | 3/2013 | Krishnaswamy |

FOREIGN PATENT DOCUMENTS

| | | |
|---|---|---|
| CN | 101205356 | 6/2008 |
| EP | 2060605 A1 | 5/2009 |
| WO | WO 02/059201 A1 | 8/2002 |
| WO | WO 2004/076582 | 9/2004 |
| WO | WO 2005/063881 A1 | 7/2005 |
| WO | WO 2011/146484 A2 | 11/2011 |
| WO | WO 2011/160053 A2 | 12/2011 |
| WO | WO 2013/184822 | 12/2013 |
| WO | WO 2013/184836 | 12/2013 |

OTHER PUBLICATIONS

Ishida, K., et al., "Comonomer Unit Composition and Thermal Properties of Poly (3-hydroxybutyrate-co-4-hydroxybutyrate)s Biosynthesized by Ralstonia Eutrop ha.", *Biomacromolecules*, 2:1285-1293 (2001).
Notification Concerning Transmittal of International Search Report, International Application No. PCT/US2011/036808, International Filing Date May 17, 2011, entitled "Toughening Polylactic Acid With Polyhydroxyalkanoates," Date of Search: Jan. 17, 2012.
Notification Concerning Transmittal of International Preliminary Report on Patentability, International Application No. PCT/US2011/036808, International Filing Date May 17, 2011, entitled "Toughening Polylactic Acid With Polyhydroxyalkanoates", Date of Communication: Nov. 20, 2012.

(Continued)

*Primary Examiner* — Terressa Boykin
(74) *Attorney, Agent, or Firm* — Foley Hoag LLP

(57) ABSTRACT

Compositions of biobased polymer blends of polymers of polybutylene succinate (PBS) or polybutylene-adipate-terephthalate (PBAT) and a polyhydroxyalkanoate copolymer are described. In certain embodiments, the copolymer is a multiphase copolymer blend having one phase a glass transition temperature of about −5° C. to about −50° C. Methods of making the compositions of the invention are also described. The invention also includes articles, films and laminates comprising the compositions.

18 Claims, No Drawings

(56) References Cited

OTHER PUBLICATIONS

Notification Concerning Transmittal of International Preliminary Report on Patentability, International Application No. PCT/US2013/044339, International Filing Date Jun. 5, 2013, entitled "Biobased Rubber Modified BioDegradable Polymer Blends", Date of Communication: Dec. 18, 2014.

Notification Concerning Transmittal of International Search Report, International Application No. PCT/US2013/044339, International Filing Date Jun. 5, 2013, entitled "Biobased Rubber Modified BioDegradable Polymer Blends", Date of Communication: Aug. 1, 2013.

Notification Concerning Transmittal of International Preliminary Report on Patentability, International Application No. PCT/US2013/044367, International Filing Date Jun. 5, 2013, entitled "Low Glass Transition Polyhydroxyalkanoates for Modification of Biodegradable Polymers", Date of Communication: Dec. 18, 2014.

Notification Concerning Transmittal of International Search Report, International Application No. PCT/US2013/044367, International Filing Date Jun. 5, 2013, entitled "Low Glass Transition Polyhydroxyalkanoates for Modification of Biodegradable Polymers", Date of Communication: Aug. 5, 2013.

Office Communication, U.S. Appl. No. 13/698,229, entitled "Toughening Polylactic Acid With Polyhydroxyalkanoates", Date of Communication: Mar. 27, 2015.

US 9,353,258 B2

LOW GLASS TRANSITION POLYHYDROXYALKANOATES FOR MODIFICATION OF BIODEGRADABLE POLYMERS

RELATED APPLICATIONS

This application is the U.S. National Stage of International Application No. PCT/US2013/044367, filed Jun. 5, 2013, which designates the U.S., published in English, and claims the benefit of U.S. Provisional Application No. 61/655,983, filed Jun. 5, 2012 and U.S. Provisional Application No. 61/788,090 filed on Mar. 15, 2013. The entire teachings of the above applications are incorporated herein by reference.

BACKGROUND OF THE INVENTION

Production of plastics derived from renewable resources is expected to grow to 3.45 million tons by the year 2020 which represents a current annual growth rate of approximately 37% for biobased plastics (*Plastics Engineering*, February 2010, p16-19). The drivers for growth of biobased plastics include the contribution to global warming from production of petroleum-based plastics, the need to reduce our dependence on limited supplies of petroleum oil, the fluctuating petroleum oil prices as well as environmental disposal problems of common petroleum-based plastics. The objective for manufacturing biobased plastics is to replace as much "fossil" or petroleum-derived carbon with "renewable" carbon in the material as possible. The percentage of "renewable" carbon can be qualitatively measured in polymer materials using $^{14}C$ radio carbon dating (ASTM D6866 test method).

Examples of biobased polymers produced from renewable resources include polyethylene (PE) produced from sugarcane ethanol (Braskem's Green Polyethylene), polylactic acid (PLA) made from corn sugar (Nature Works Ingeo™ PLA), polyhydroxyalkanoates (PHA's) produced by the fermentation of glucose (U.S. Pat. Nos. 6,593,116 and 6,913,911 as well as US Patent Pub. No. 2010/0168481) and thermoplastic starch derived from plants such as potato, corn and tapioca. Reportedly, the most commercially important bioplastics by the year 2020 will include starch-based polymers, PLA, PE, PHA and epoxy resins (Shen et al., (2010), *Biofuels, Bioproducts and Biorefining*, vol. 4, Iss. 1, p25-49).

Polyhydroxyalkanoates are unique materials to use as components in biodegradable plastic blends because they are easily blended with many other plastics, they can be manufactured as 100% biobased materials, their compositions can be varied to provide very rigid to very flexible substrates and they biodegradable in a number of different environments (water, soil, compost). Blends of PHA's with other biodegradable plastics have been investigated previously such as blends of PBS and PBSA with P3HB-co-4HB (International Pub. WO2010/151798); blends of P3HB-co-4HB with polybutylene-adipate-terephthalate (PBAT) (US Pub. No 2011/0189414) and blends of P3HB-co-4HB with polyvinyl acetate (PVAc) (International Pub. No 2011/031558). While the above blends showed improved mechanical properties and a range of biodegradation rates, the blends did not have properties that enabled them to be used for blown film applications which require high toughness, tear resistance and puncture resistance.

Therefore, a need exists for producing biodegradable plastic blends with improved toughness, tear and puncture resistance properties.

SUMMARY OF THE INVENTION

Described herein are biodegradable polymer blend compositions comprising polybutylene succinate (PBS) or polybutylene-adipate-terephthalate (PBAT) blended with a biobased, high molecular weight rubber 3-hydroxybutyrate copolymer having one or more of the comonomers selected from 4-hydroxybutyrate (4HB), 5-hydroxyvalerate (5HV), 3-hydroxyhexanoate (3HH) or 3-hydroxyoctanoate (3HO). The monoments are incorporated into the copolymer at 25-85% by weight and wherein the copolymer has a renewable carbon content of at least 60% by weight (e.g., 60%, 75%, 80%, 85%, 90%). These blend compositions have improved mechanical and processing properties such as tensile toughness, tear strength, melt elasticity, melt strength and pliability which allow them to be processed as blown films. Additionally, these biobased compositions when made into blown films, laminates or other thin layered articles, do not have the undesirable property of making noise when manipulated or handled.

In a first aspect, the invention pertains to branched biodegradable compositions comprising a polymer blend of PBS or PBAT with a biobased copolymer of 3-hydroxybutyrate wherein one or more of the comonomers selected from 4-hydroxybutyrate, 5-hydroxyvalerate, 3-hydroxyhexanoate or 3-hydroxyoctanoate, are incorporated at 25 weight % to about 85% weight of the copolymer, having a glass transition temperature of about −5° C. to about −50° C., wherein the renewable carbon content of the biodegradable blend is at least 5% by weight of the composition.

In a second aspect, a branched biodegradable composition comprising a polymer blend of PBS or PBAT and a biobased copolymer of 3-hydroxybutyrate wherein one or more comonomers selected from the group 4-hydroxybutyrate, 5-hydroxyvalerate, 3-hydroxyhexanoate or 3-hydroxyoctanoate, are incorporated at 25 weight % to about 85 weight % of the copolymer, having a glass transition temperature of about −15° C. to about −50° C., and a plasticizer in an amount sufficient to increase the biodegradation rate of the composition and wherein the renewable carbon content of the biodegradable blend is at least 5% by weight of the composition. In certain embodiments, the compositions include a plasticizer which is selected from CITROLFEX® A4 plasticizer, PLASTIHALL® P643 plasticizer, PARAPLEX® 8654 plasticizer and PARAPLEX® A8600 plasticizer or combination thereof.

In certain embodiments of the first aspect, the 3-hydroxybutyrate copolymer has one or more of the comonomers 4-hydroxybutyrate, 5-hydroxyvalerate, 3-hydroxyhexanoate or 3-hydroxyoctanoate incorporated into the copolymer composition at about 25 weight % to about 85 weight %, about 30 weight % to about 80 weight % of the copolymer composition, about 40% to about 75% in the copolymer composition, about 40% to about 65% in the copolymer composition, about 40% to about 50% in the copolymer composition, about 45% to about 50% in the copolymer composition.

In a second embodiment of the first aspect of the invention, the biobased copolymer of 3-hydroxybutyrate comprising one or more comonomers selected from the group 4-hydroxybutyrate, 5-hydroxyvalerate, 3-hydroxyhexanoate and 3-hydroxyoctanoate has a molecular weight of about 600,000 to about 2,000,000 g/mole (Daltons) or about 950,000 to about 1,500,000 g/mole (Daltons).

In a third embodiment, including other embodiments and aspects of the invention, the weight percent the 3-hydroxybutyrate copolymer in the blend is between 5-95% by weight, about 35-75% by weight of the composition, about 35% to about 65% by weight of the total composition, or about 40% to about 50% by weight of the total composition.

In a fourth embodiment of any of the aspects and embodiments of the invention, the composition of the biodegradable blend comprises two phases, wherein the phases can be continuous or co-continuous.

In a third aspect of the invention, the compositions of the invention have a renewable carbon content of the biodegradable blend is a least 5% by weight of the composition, at least 10% by weight of the composition, at least 20% by weight of the composition, at least 30% by weight of the composition, at least 35% by weight of the composition, at least 40% by weight of the composition, at least 45% by weight of the composition, or at least 50% by weight of the composition.

In the embodiments and aspects of the invention, the renewable carbon content of the poly-3-hydroxybutyrate copolymer is at least 60% by weight of the copolymer, at least 70% by weight of the copolymer, at least 80% by weight of the copolymer, at least 85% by weight of the copolymer, at least 90% by weight of the copolymer, at least 95% by weight of the copolymer, or at 100% by weight of the copolymer.

In a fourth aspect of the invention, the composition further comprises one or more of the following: other polyhydroxyalkanoates such as poly-3-hydroxybutyrate-co-5-hydroxyvalerate (P3HB-5HV), poly-3-hydroxybutyrate-co-3-hydroxyhexanoate (P3HB-3HH), poly-3-hydroxybutyrate-co-3-hydroxyoctanoate (P3HB-3HO).

In a fifth aspect of the invention, the branched composition was formed by reactive blending with a branching agent, for example dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy)hexane, 2,5-dimethyl-2,5-di(t-amyl peroxy)hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, and di-t-butyldiperoxyphthalate or combinations thereof at a concentration of about 0.001% to about 0.5% by weight of the blend composition. In certain embodiments, a co-agent for reacting with the polymer blend composition is included, for example, diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl)phosphate, or combinations thereof, a epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or an epoxidized oil or combinations thereof. The composition of any of the aspects or embodiments, further comprise a nucleating agent selected from one or more of the following carbon black, cyanuric acid, uracil, thymine, mica talc, silica, boron nitride, barium nitride, clay, calcium carbonate, synthesized silicic acid and salts, metal salts of organophosphates, and kaolin or combination thereof.

In a fifth embodiment of any of the aspects of the invention, the 3-hydroxybutyrate copolymer comprises an amorphous rubber phase having no melting point.

In a sixth aspect of the invention, the composition further includes one or more additives, for example, one or more selected from plasticizers, clarifiers, nucleating agents, thermal or oxidative stabilizers, inorganic fillers, anti-slip agents, compatibilizers (e.g., maleic anhydride), blocking agents or a combination thereof or a dendritic or hyperbranched polyester.

In a seventh aspect of the invention, the composition has continuous or co-continuous phases.

In a ninth aspect of the invention, a branched biodegradable polymer compositions can include a blend of PBS or PBAT and a biodegradable polyhydroxyalkanoate (PHA) polymer. The biodegradable PHA polymer can have a glass transition temperature (Tg) of between about −5° C. and about −50° C. and a molecular weight of between about 450,000 Daltons and about 1,500,000 Daltons. The PHA can be a copolymer of 3-hydroxybutyrate one or more monomers selected from 4-hydroxybutyrate, 5-hydroxyvalerate, 3-hydroxyhexanoate and 3-hydroxyoctanoate. The monomers can be present at between about 25% and about 85% of the weight of the PHA polymer. The PHA polymer can be between about 3% and about 40% of the weight of the branched biodegradable polymer compositions.

In a tenth aspect of the invention, branched biodegradable polymer compositions can include a blend of PBS or PBAT and a biodegradable polyhydroxyalkanoate (PHA) polymer of poly-3-hydroxybutyrate-co-4-hydroxybutyrate. The biodegradable PHA polymer can have a glass transition temperature (Tg) of between about −5° C. and about −50° C. and a molecular weight of between about 450,000 Daltons and about 1,500,000 Daltons. The 4-hydroxybutyrate can be present at between about 25% and about 85% of the total weight of the PHA copolymer. The PHA polymer can be between about 3% and about 40% of the weight of the branched biodegradable polymer compositions.

In an eleventh aspect of the invention, branched biodegradable polymer compositions can include a blend of PBS or PBAT and a biodegradable polyhydroxyalkanoate (PHA) polymer of poly-3-hydroxybutyrate-co-5-hydroxyvalerate. The biodegradable PHA polymer can have a glass transition temperature (Tg) of between about −5° C. and about −50° C. and a molecular weight of between about 450,000 Daltons and about 1,500,000 Daltons. The 5-hydroxyvalerate can be present at between about 25% and about 85% of the total weight of the PHA copolymer. The PHA polymer can be between about 3% and about 40% of the weight of the branched biodegradable polymer compositions.

In a twelfth aspect of the invention, branched biodegradable polymer compositions can include a blend of PBS or PBAT and a biodegradable polyhydroxyalkanoate (PHA) polymer of poly-3-hydroxybutyrate-co-3-hydroxyhexanoate. The biodegradable PHA polymer can have a glass transition temperature (Tg) of between about −5° C. and about −50° C. and a molecular weight of between about 450,000 Daltons and about 1,500,000 Daltons. The 3-hydroxyhexanoate can be present at between about 25% and about 85% of the total weight of the PHA copolymer. The PHA polymer can be between about 3% and about 40% of the weight of the branched biodegradable polymer compositions.

In a thirteenth aspect of the invention, branched biodegradable polymer compositions can include a blend of PBS or PBAT and a biodegradable polyhydroxyalkanoate (PHA) polymer of poly-3-hydroxybutyrate-co-3-hydroxyoctanoate. The biodegradable PHA polymer can have a glass transition temperature (Tg) of between about −5° C. and about −50° C. and a molecular weight of between about 450,000 Daltons and about 1,500,000 Daltons. The 3-hydroxyoctanoate can be present at between about 25% and about 85% of the total weight of the PHA copolymer. The PHA polymer can be between about 3% and about 40% of the weight of the branched biodegradable polymer compositions.

The compositions of the invention can be produced to resins, pellets, finished articles, films or multilayer laminates including at least one film layer having the composition of the invention, for example a film having a thickness of about 1 to about 2 microns.

Articles made with the laminate and articles such as foam woven and nonwoven fibers or a thermoformed part of the invention are also contemplated.

Also included is a biobased copolymer of 3-hydroxybutyrate and one or more comonomers selected from 4-hydroxybutyrate, 5-hydroxyvalerate, 3-hydroxyhexanoate and 3-hydroxyoctanoate prepared by culturing a recombinant host with a renewable feedstock to produce a biobased 3-hydroxybutyrate copolymer biomass for use in the compositions of the invention described above. The source of the renewable feedstock is selected from glucose, fructose, sucrose, arabinose, maltose, lactose, xylose, glycerol, ethanol, methanol, fatty acids, vegetable oils, and biomass derived synthesis gas or a combination thereof. The renewable carbon content of the biobased poly-3-hydroxybutyrate-co-4-hydroxybutyrate copolymer is easily determined using the method described in ASTM D6866.

The reactive blends of the invention having a total % 4HB or %5HV or %3HH or %3HO content of at least 25-85% by weight (not 100%) have unexpectedly tough and tear resistant properties, for example, films made from the compositions described here in have desirable properties for commercial products, for example, the noise level when handled or manipulated (i.e., is crinkly) that other biodegradable products have is reduced, or optimally have no noise. Additionally, the formulations have sufficient tear strength and toughness and are capable of being processed on a blown film line.

In other embodiments, the blend compositions are biodegradable, compostable and biobased.

In certain embodiments of the invention, the compositions of any of the aspects of the invention are made by melt reacting the polymers with a branching agent in the presence of a co-agent (also referred to herein, as a "cross-linking agent"), thereby forming a branched polymer blend. The conditions of the reaction are suitable for reacting the branching agent alone or with a cross-linking agent and a polymer blend. A "branched" polymer is a polymer with a branching of the polymer chain or cross-linking of two or more polymer chains.

The cross-linking agent when reacted, for example, at an epoxide group(s), epoxy functional compound, or double bond(s), becomes bonded to another molecule, e.g., a polymer or branched polymer. As a consequence the multiple molecules become cross-linked through the reactive group on the cross-linking agent. An "epoxy functional compound" is a cross-linking agent comprising two or more epoxy functional groups.

In certain embodiments, the functional group of the cross-linking agent is an epoxy-functional compound, for example, an epoxy-functional styrene-acrylic polymer, an epoxy-functional acrylic copolymer, an epoxy-functional polyolefin copolymer, oligomers comprising glycidyl groups with epoxy functional side chains, an epoxy-functional poly(ethylene-glycidyl methacrylate-co-methacrylate), or an epoxidized oil, poly(ethylene-co-methacrylate-coglycidyl methacrylate, ethylene-n-butyl acrylate-glycidyl methacrylate or combinations thereof.

In other embodiment, the cross-linking agent contains at least two reactive double bonds. These cross-linking agents include but are not limited to the following: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof.

One or more additives may also be included in the compositions of any of the aspects of the invention and methods of the inventions. The types of additives include but are not limited to plasticizers, clarifiers, nucleating agents, thermal stabilizers, inorganic fillers, anti-slip agents, and anti-blocking agents. Although sometimes not needed in the blend, compatibilizers can also be added. In particular embodiments of the first and second aspect of the invention, a nucleating agent is added. In other embodiments of the first and second aspects of the invention, a nucleating agent and a compatibilizer are added, in certain of these embodiments, the nucleating agent is cyanuric acid or boron nitride and the compatibilizer is maleic anhydride.

In another embodiment, a method of making a tough, tear resistant biodegradable article comprising a branched PBS or PBAT and 3-hydroxybutyrate copolymer, comprising the steps of: melt-blending 3-hydroxybutyrate copolymer and PBS or PBAT with a branching agent under conditions that cause melting and branching of the blend, thereby forming a molten branched polymer composition; and forming an article from the branched molten polymer composition; thereby making an article comprising a tough, tear resistant biodegradable, branched polymer composition of PBS or PBAT and 3-hydroxybutyrate copolymer. Articles, films and laminates comprising the compositions of the invention are also described.

DETAILED DESCRIPTION

Described herein are biodegradable polymer blend compositions comprising polybutylenesuccinate (PBS) or polybutylene-adipate-terephthalate (PBAT) and a 3-hydroxybutyrate copolymer incorporating one or more monomers comprising 4-hydroxybutyrate (4HB), 5-hydroxyvalerate (5HV), 3-hydroxyhexanoate (3HH) and 3-hydroxyoctanoate (3HO) having a renewable carbon content of at least 5% by weight with improved properties such as tensile toughness, tear strength, puncture resistance, melt elasticity, melt strength and pliability.

In a first aspect, the invention pertains to branched biodegradable compositions comprising a polymer blend of PBS or PBAT and a biobased 3-hydroxybutyrate copolymer comprising one or more monomers selected from 4-hydroxybutyrate, 5-hydroxyvalerate, 3-hydroxyhexanoate and 3-hydroxyoctanoate which are incorporated into the copolymer at about 25 weight % to about 85 weight %, impart to the copolymer a glass transition temperature of about −15° C. to about −50° C. and provide a renewable carbon content of the biodegradable blend is at least 5% by weight of the composition.

In particular, when these polymers are melt-blended in the presence of a branching agent, for example, organic peroxide, the resultant compositions display many unexpected synergies in melt rheology, thermal stability, processing and mechanical properties, such as film processing and film properties.

The toughness enhancement found was even greater in the PHA blends that were prepared using reactive melt-blending than without reactive melt-blending.

Pure P4HB, P5HV, P3HH or P3HO homopolymers are mostly amorphous, rubbery polymers at room temperature with significantly lower glass transition temperatures ($T_g$=−30 to −50° C.) than that of pure PBS ($T_g$=−10° C.) or pure PBAT ($T_g$=−30° C.). When the 4HB, 5HV, 3HH or 3HO monomers are combined with 3-hydroxybutyrate in a copolymer, where the %4HB, 5HV, 3HH or 3HO>25% by weight, the copolymer retains its rubbery properties ($T_g$=−15° C. to −50° C.). If the rubbery PHA copolymer is blended with other polymers, it readily forms a separate rubber phase which imparts a toughening effect on the overall polymer blend. Because of this property and its proven biodegradability in various environments, the 3-hydroxybutyrate copolymers are beneficial materials for improving the toughness properties of other polymers while maintaining the overall biodegradability or decomposition of the blend.

The toughness of the biodegradable blend is further improved by reactive blending. In particular, when the PBS or PBAT and 3-hydroxybutyate copolymers are reactively melt-blended in the presence of a branching agent, for example, an organic peroxide, the resultant PBS or PBAT/3-hydroxybutyrate (3HB) rubbery copolymer blend displays significant improvements in tensile toughness and elongation. In certain aspects, the process of reactively blending the 3-hydroxybutyrate (3HB) and 4-hydroxybutyrate (4HB) copolymer/polymer together further includes the use of a co-agent, such as a multifunctional carboxylic acid acrylate, or a crosslinking agent, such as an epoxide-containing acrylate copolymer, resulting in further improvements in PBS or PBAT polymer blend mechanical properties.

Combining (e.g., mixing or blending) the 3-hydroxybutyrate copolymer with other polymers in the presence of peroxide provides the following benefits compared to combining the polymer blends or mixtures without any reactive chemistry: (1) higher tensile elongation (2) higher tensile toughness (3) improved thermal stability and/or better melt stability (4) improved tear strength and (5) improve impact strength, resulting in a broader processing window for the overall composition and subsequent applications of these compositions in production of articles, films and the like.

The invention provides branched 3-hydroxybutyrate copolymer/polymer compositions and methods of preparing branched blends with improved tensile toughness and elongation as well as tear and impact strength. The use of branching, cross-linking or co-agents further improves the desired properties of the polymer blend composition over the starting compositions without the cross-linking or co-agents and branching agents. In one aspect, the cross-linking agents comprise two or more reactive groups such as double bonds or epoxides. These cross-linking agents react with and become covalently bonded (connected) to the polymer. The connection of multiple chains through these cross-linking agents forms a branched polymer blend. The branched polymer blend has increased tensile toughness and elongation over the starting polymer blend.

The temperatures experienced by a polymer during processing can cause a drop in melt strength due to thermal degradation, which can in turn cause difficulties in processing the polymer(s). Increased melt strength is therefore useful in that it allows the polymers to be processed across a broader temperature range. A broader "processing window" is especially important in certain polymer applications, such as in the production of blown film (i.e., in preventing or reducing bubble collapse), or cast film extrusion, thermoformed articles (i.e., preventing or reducing sheet sag during thermoforming), profile extruded articles (i.e., preventing or reducing sag), non-woven fibers, monofilament, etc. Additionally, articles made from the compositions described herein exhibit greater tensile toughness and elongation while maintaining biodegradability. The increases in tensile toughness can be 5 to 40 fold greater. The increases in elongation can be 5 to 60 fold greater. Tensile toughness increase can be 10-20, 20-30 or 25-35 fold. Elongation increase can be 20-30, 30-40 or 45-60 fold.

Increased melt strength is useful in that it allows the polymers to be formed utilizing a broader temperature range when the polymer is processed. Typically due to the polymer's thermal instability at processing temperatures, they accordingly experience a drop in melt strength. This can cause difficulties in processing these polymers. Additionally, the improvement shown in films made from the methods and compositions described herein are greater tensile strength, tear resistance and greater puncture resistance.

The films produced by the compositions described herein can also be used to make laminates. The biodegradable laminates comprising the compositions of the invention are suitable for coating other layers such as paper to produce articles or containers. The laminate is produced for example by co-extruding a composition of the invention onto a paper layer or with another thermoplastic blend or composition. Other layers of thermoplastic polymers or additional layers of a composition of the invention can also be included or stacked to form laminates. For example, adhesive layers can also be added or other polymer layers that impart particular desired properties. For example, the blended materials or laminates can be different and improved by varying compositions to change the degree of hardness, softness, flexibility, tackiness, toughness, ductility, processability, opaqueness and the like. Additives, such as anti-blocking agents, plasticizers and the like are also contemplated.

In certain aspects, the laminate can be 1 to 15 layers, for example 2 layers, 3 layers, 4 layers or 5 layers, 6 layers, 7 layers, 8 layers, 10 layers, 11 layers, 12 layers, 13 layers, 14 layers or 15 layers. The overall size of the laminate is about 10 microns to about 100 microns, for example 10-50 microns, 20-60 microns, 25-75 microns. Each individual layer can be about 1 to about 2 microns, for example about 1 to about 5 micron, about 2 to about 4 microns, about 2 to about 5 microns. For each laminate, at least one layer is a composition of the invention, for example, the composition of the first, second, third or fourth aspect of the invention. In certain embodiments, the compositions of the invention comprise more than one layer, for example two, three, four or more.

The methods and branched compositions of the invention improve the melt strength of polymer compositions, a desirable property for many polymer product applications. Melt strength is a rheological property that can be measured a number of ways. One measure is G' where G' is the polymer storage modulus measured at melt processing temperatures.

As used herein, amorphous refers to the state of the 3-hydroxybutyrate (3HB) copolymer which is not crystalline, for example, no lattice structure or long range molecular order characteristic of a crystalline state. The degree of crystallinity for the invention described herein is the fraction of the polymer that exists in an orderly state, having a lattice structure. In certain embodiments, one phase of the multiphase 3HB copolymer is between about 0 to about 5% crystallinity, for example the degree of crystallinity in percent is about 0, or is minimally observed to be less than about 1%. In a preferred embodiment, the degree of crystallinity of one phase of the multiphase 3-hydroxybutyrate (3HB) and 4-hydroxybutyrate (4HB) copolymer polymer is below 3%, for example, below 2% or below 1% or ranges or numbers calculated between these percentages such as 2.5%. The degree of crystallinity calculated for the compositions of the invention is minimal and can be determined by various methods, for example, density calculations, x-ray and electron diffraction, differential scanning calorimetry, infrared absorption (FTIR), Raman spectroscopy and the like.

$T_g$ is the glass transition temperature or the glass-rubber transition temperature. It is defined as the temperature where the polymer chains begin coordinated molecular motions. Physically, the polymer modulus begins to drop several orders of magnitude until the polymer finally reaches a rubbery state.

Physical properties and rheological properties of polymeric materials depend on the molecular weight and distribution of the polymer. "Molecular weight" is calculated in a number of different ways. Unless otherwise indicated, "molecular weight" refers to weight average molecular weight.

"Number average molecular weight" ($M_n$) represents the arithmetic mean of the distribution, and is the sum of the products of the molecular weights of each fraction, multiplied by its mole fraction ($\Sigma N_i M_i / \Sigma N_i$).

"Weight average molecular weight" ($M_w$) is the sum of the products of the molecular weight of each fraction, multiplied by its weight fraction ($\Sigma N_i M_i^2 / \Sigma N_i M_i$). $M_w$ is generally greater than or equal to $M_n$.

The weight average molecular weight of the PHA amorphous rubber phase or the rubber phase of the multiphase PHA used in the compositions of the invention ranges between about 600,000 to about 2,000,000 Daltons as measured by light scattering and GPC with polystyrene standards. In particular embodiments molecular weight is about 750,000 or about 1,500,000 Daltons.

One way of increasing the melt strength is by branching the polymers (PBS or PBAT) with PHA and combinations thereof, and various methods for accomplishing this are described herein. Branching of PBS or PBAT with the PHAs is a result of reacting the polymers with branching agents, for example, peroxides. Also, cross-linking agents, for example, reactive compounds (compounds with epoxy groups and compounds with reactive double bonds) that enhance or increase the branching of the polymer, can also be used.

Addition of other reactive polymeric compounds, such as reactive acrylics or dendritic hydroxyls can also be employed to generate and modify the branching architecture of the PHA blends. The use and selection of additives to these compositions result in improved properties. All of these methods are described herein.

The invention provides biodegradable, branched and unbranched 3-hydroxybutyrate copolymer blend compositions that do not require the use of a compatibilizer for mixing and blending that other PBS or PBAT thermoplastic polymer compositions require. In these other compositions the compatibilizer is necessary to improve the properties of the blends and increase the compatibility of the polymer composition, especially immiscible polymers.

Polyhydroxyalkanoates (PHAs)

PHAs are biological polyesters synthesized by a broad range of natural and genetically engineered bacteria as well as genetically engineered plant crops (Braunegg et al., (1998), *J. Biotechnology* 65:127-161; Madison and Huisman, 1999, *Microbiology and Molecular Biology Reviews*, 63:21-53; Poirier, 2002, *Progress in Lipid Research* 41:131-155). These polymers are biodegradable thermoplastic materials, produced from renewable resources, with the potential for use in a broad range of industrial applications (Williams & Peoples, *CHEMTECH* 26:38-44 (1996)).

Useful microbial strains for producing PHAs, include *Alcaligenes eutrophus* (renamed as *Ralstonia eutropha*), *Alcaligenes latus, Azotobacter, Aeromonas, Cornamonas, Pseudomonads*, and genetically engineered organisms including genetically engineered microbes such as *Pseudomonas, Ralstonia* and *Escherichia coli*.

In general, a PHA is formed by enzymatic polymerization of one or more monomer units inside a living cell. Over 100 different types of monomers have been incorporated into the PHA polymers (Steinbüchel and Valentin, 1995, *FEMS Microbiol. Lett* 128:219-228. Examples of monomer units incorporated in PHAs for this invention include 2-hydroxybutyrate, glycolic acid, 3-hydroxybutyrate (hereinafter referred to as 3HB), 3-hydroxypropionate (hereinafter referred to as 3HP), 3-hydroxyvalerate (hereinafter referred to as 3HV), 3-hydroxyhexanoate (hereinafter referred to as 3HH), 3-hydroxyheptanoate (hereinafter referred to as 3HH), 3-hydroxyoctanoate (hereinafter referred to as 3HO), 3-hydroxynonanoate (hereinafter referred to as 3HN), 3-hydroxydecanoate (hereinafter referred to as 3HD), 3-hydroxydodecanoate (hereinafter referred to as 3HDd), 4-hydroxybutyrate (hereinafter referred to as 4HB), 4-hydroxyvalerate (hereinafter referred to as 4HV), 5-hydroxyvalerate (hereinafter referred to as 5HV), and 6-hydroxyhexanoate (hereinafter referred to as 6HH). 3-hydroxyacid monomers incorporated into PHAs are the (D) or (R) 3-hydroxyacid isomer with the exception of 3HP which does not have a chiral center. For compositions included herein, the PHA composition does not include poly(lactic acid).

In some embodiments, the PHA in the methods described herein is a homopolymer (where all monomer units are the same). Examples of PHA homopolymers include poly 3-hydroxyalkanoates (e.g., poly 3-hydroxypropionate (hereinafter referred to as P3HP), poly 3-hydroxybutyrate (hereinafter referred to as P3HB) and poly 3-hydroxyvalerate), poly 4-hydroxyalkanoates (e.g., poly 4-hydroxybutyrate (hereinafter referred to as P4HB), or poly 4-hydroxyvalerate (hereinafter referred to as P4HV)) and poly 5-hydroxyalkanoates (e.g., poly 5-hydroxyvalerate (hereinafter referred to as P5HV)).

In certain embodiments, the starting PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

By selecting the monomer types and controlling the ratios of the monomer units in a given PHA copolymer a wide range of material properties can be achieved. Although examples of PHA copolymers having two different monomer units have been provided, the PHA can have more than two different monomer units (e.g., three different monomer units, four different monomer units, five different monomer units, six different monomer units) An example of a PHA having 4 different monomer units would be PHB-co-3HH-co-3HO-co-3HD or PHB-co-3-HO-co-3HD-co-3HDd (these types of PHA copolymers are hereinafter referred to as PHB3HX). Typically where the PHB3HX has 3 or more monomer units the 3HB monomer is at least 70% by weight of the total monomers, preferably 85% by weight of the total monomers, most preferably greater than 90% by weight of the total monomers for example 92%, 93%, 94%, 95%, 96% by weight of the copolymer and the HX comprises one or more monomers selected from 3HH, 3HO, 3HD, 3HDd.

The homopolymer (where all monomer units are identical) P3HB and 3-hydroxybutyrate copolymers (P3HB3HP, P3HB4HB, P3HB3HV, P3HB4HV, P3HB5HV, P3HB3HHP, hereinafter referred to as PHB copolymers) containing 3-hydroxybutyrate and at least one other monomer are of particular interest for commercial production and applications. It is useful to describe these copolymers by reference to their material properties as follows. Type 1 PHB copolymers typically have a glass transition temperature (Tg) in the range of 6° C. to –10° C., and a melting temperature $T_M$ of between 80° C. to 180° C. Type 2 PHB copolymers typically have a Tg of –05° C. to –50° C. and Tm of 55° C. to 90° C. In particular embodiments, the Type 2 copolymer has a phase component with a $T_g$ of –15° C. to –45° C. and no Tm.

Preferred Type 1 PHB copolymers have two monomer units have a majority of their monomer units being 3-hydroxybutyrate monomer by weight in the copolymer, for example, greater than 78% 3-hydroxybutyrate monomer. Preferred PHB copolymers for this invention are biologically produced from renewable resources and are selected from the following group of PHB copolymers:

PHB3HV is a Type 1 PHB copolymer where the 3HV content is in the range of 3% to 22% by weight of the polymer and preferably in the range of 4% to 15% by weight of the copolymer for example: 4% 3HV; 5% 3HV; 6% 3HV; 7% 3HV; 8% 3HV; 9% 3HV; 10% 3HV; 11% 31-1V; 12% 3HV; 13% 3HV; 14% 3HV; 15% 3HV;

PHB3HP is a Type 1 PHB copolymer where the 3HP content is in the range of 3% to 15% by weight of the copolymer and preferably in the range of 4% to 15% by weight of the copolymer for example: 4% 3HP; 5% 3HP; 6% 3HP; 7% 3HP; 8% 3HP; 9% 3HP; 10% 3HP; 11% 3HP; 12% 3HP. 13% 3HP; 14% 3HP; 15% 3HP.

PHB4HB is a Type 1 PHB copolymer where the 4HB content is in the range of 3% to 15% by weight of the copolymer and preferably in the range of 4% to 15% by weight of the copolymer for example: 4% 4HB; 5% 4HB; 6% 4HB; 7% 4HB; 8% 4HB; 9% 4HB; 10% 4HB; 11% 4HB; 12% 4HB; 13% 4HB; 14% 4HB; 15% 4HB.

PHB4HV is a Type 1 PHB copolymer where the 4HV content is in the range of 3% to 15% by weight of the copolymer and preferably in the range of 4% to 15% by weight of the copolymer for example: 4% 4HV; 5% 4HV; 6% 4HV; 7% 4HV; 8% 411V; 9% 4HV; 10% 4HV; 11% 4HV; 12% 4HV; 13% 4HV; 14% 4HV; 15% 4HV.

PHB5HV is a Type 1 PHB copolymer where the 5HV content is in the range of 3% to 15% by weight of the copolymer and preferably in the range of 4% to 15% by weight of the copolymer for example: 4% 5HV; 5% 5HV; 6% 5HV; 7% 5HV; 8% 5HV; 9% 5HV; 10% 5HV; 11% 5HV; 12% 5HV; 13% 5HV; 14% 5HV; 15% 5HV.

PHB3HH is a Type 1 PHB copolymer where the 3HH content is in the range of 3% to 15% by weight of the copolymer and preferably in the range of 4% to 15% by weight of the copolymer for example: 4% 3HH; 5% 3HH; 6% 3HH; 7% 3HH; 8% 3HH; 9% 3HH; 10% 3HH; 11% 3HH; 12% 3HH; 13% 3HH; 14% 3HH; 15% 3HH;

PHB3HX is a Type 1 PHB copolymer where the 3HX content is comprised of 2 or more monomers selected from 3HH, 3HO, 3HD and 3HDd and the 3HX content is in the range of 3% to 12% by weight of the copolymer and preferably in the range of 4% to 10% by weight of the copolymer for example: 4% 3HX; 5% 3HX; 6% 3HX; 7% 3HX; 8% 3HX; 9% 3HX; 10% 3HX by weight of the copolymer.

Type 2 PHB copolymers have a 3HB content of between 80% and 5% by weight of the copolymer, for example 80%, 75%, 70%, 65%, 60%, 55%, 50%, 45%, 40%, 35%, 30%, 25%, 20%, 15%, 10%, 5% by weight of the copolymer.

PHB4HB is a Type 2 PHB copolymer where the 4HB content is in the range of 20% to 60% by weight of the copolymer and preferably in the range of 25% to 50% by weight of the copolymer for example: 25% 4HB; 30% 4HB; 35% 4HB; 40% 4HB; 45% 4HB; 50% 4HB by weight of the copolymer.

PHB5HV is a Type 2 PHB copolymer where the 5HV content is in the range of 20% to 60% by weight of the copolymer and preferably in the range of 25% to 50% by weight of the copolymer for example: 25% 5HV; 30% 5HV; 35% 5HV; 40% 5HV; 45% 5HV; 50% 5HV by weight of the copolymer.

PHB3HH is a Type 2 PHB copolymer where the 3HH is in the range of 35% to 95% by weight of the copolymer and preferably in the range of 40% to 80% by weight of the copolymer for example: 40% 3HH; 45% 3HH; 50% 3HH; 55% 3HH, 60% 3HH; 65% 3HH; 70% 3HH; 75% 3HH; 80% 3HH by weight of the copolymer.

PHB3HX is a Type 2 PHB copolymer where the 3HX content is comprised of 2 or more monomers selected from 3HH, 3HO, 3HD and 3HDd and the 3HX content is in the range of 30% to 95% by weight of the copolymer and preferably in the range of 35% to 90% by weight of the copolymer for example: 35% 3HX; 40% 3HX; 45% 3HX; 50% 3HX; 55% 3HX 60% 3HX; 65% 3HX; 70% 3HX; 75% 3HX; 80% 3HX; 85% 3HX; 90% 3HX by weight of the copolymer.

Microbial systems for producing the PHB copolymer PHBV are disclosed in, e.g., U.S. Pat. No. 4,477,654 to Holmes, which is incorporated herein by reference in its entirety. U.S. Published Application No. US 2002/0164729 (also incorporated herein by reference in its entirety) by Skraly and Sholl describes useful systems for producing the PHB copolymer PHB4HB. Useful processes for producing the PHB copolymer PHB3HH have been described (Lee et al., 2000, *Biotechnology and Bioengineering* 67:240-244; Park et al., 2001, *Biomacromolecules* 2:248-254). Processes for producing the PHB copolymers PHB3HX have been described by Matsusaki et al. (*Biomacromolecules* 2000, 1:17-22).

In determining the molecular weight, techniques such as gel permeation chromatography (GPC) or flow injection polymer analysis (FIPA) can be used. In the GPC or FIPA methodology, a polystyrene standard is utilized either as a calibration standard or a check standard. For GPC, the weight average molecular reported from is relative to the polystyrene standards used (polystyrene equivalent weight). For FIPA, the weight average molecular weight reported is not relative to the polystyrene standard but rather is an absolute measurement of molecular weight. The PHA can have an absolute weight average molecular weight (in daltons) of at least 500, at least 10,000, or at least 50,000 and/or less than 2,000,000, less than 1,000,000, less than 1,500,000, and less than 800,000. In certain embodiments, preferably, the PHAs generally have a weight-average molecular weight in the range of 100,000 to 700,000. For example, the molecular weight range for PHB and Type 1 PHB copolymers for use in this application are in the range of 400,000 daltons to 1.5 million daltons as determined by GPC method and the molecular weight range for Type 2 PHB copolymers for use in the application 100,000 to 1.5 million daltons.

In certain embodiments, the PHA can have a linear equivalent weight average molecular weight of from about 150,000 Daltons to about 500,000 Daltons and a polydispersity index of from about 2.5 to about 8.0. As used herein, weight average molecular weight and linear equivalent weight average molecular weight are determined by flow injection polymer analysis, using, e.g., THF is used as the eluent while chloroform is used as the diluent for the PHA samples.

Polybutylene Succinate (PBS)

Poly butylene succinate (PBS) is a synthetic, petroleum-based aliphatic polyester, made by condensation polymerization followed by chain extension using multi-functional isocyanates. PBS is a combination of the monomers 1,4-butane diol and succinic acid. Although usually synthesized from petroleum, it is also possible for the monomers that make up to be produced from biobased feedstock. PBS is commercially available for example from, Showa HighPolymer, Japan; SkyGreen BDP, Korea; and SK Polymer, Ire Chemicals Co., Korea; and Sqehan Co, Korea; among others.

The two polymers are reportedly biodegradable at ambient temperatures (i.e., are "cold compostable") in soil and marine conditions. PBS degrades more slowly compared to PHA polymers. PBS is hydro-biodegradable and begins to biodegrade via a hydrolysis mechanism. Hydrolysis occurs at the ester linkages and this results in a lowering of the polymer's molecular weight, allowing for further degradation by microorganisms.

PBS has high crystallinity, and is suitable mostly for molding applications. The polymer has a low (sub-zero) glass transition temperature (Tg), and its processing temperature overlaps with PHA. As disclosed herein, PHA polymers can be combined with PBS using conventional melt-blending techniques. In this invention, the above-mentioned blends are melt-blended in the presence of a reactive entity such as organic peroxide branching agents; branching co-agents may also be used. The reactive blending approach produces compositions that have considerably better melt and solid-state properties compared to the non-reactive blends. In particular, the reactive (inventive) blends have higher melt strength, a broader processing window, and better mechanical properties such as tensile and tear strength.

Reactive blends were found to process very well, with improved anti-blocking behavior, higher line speeds and better roll release behavior. Addition of rubber-like PHA's improved the tear, puncture, and tensile strength performance of PBS films. In general, reactive blending resulted in considerably better performance characteristics of finished blown films relative to equivalent dry blends.

Polybutylene-Adipate-Terephthalate (PBAT)

Polybutylene-adipate-terethphalate is a biodegradable polyester that is part of a larger class of aromatic/aliphatic polyesters which contain: i) at least one aliphatic dicarboxylic acid; and/or ii) at least one aromatic dicarboxylic acid; and iii) a dihydroxy compound. In certain polyesters of this class, the aliphatic dicarboxylic acid is a C2 to C12 aliphatic dicarboxylic acid such as, succinic acid, glutaric acid, dimethyl glutaric acid, adipic acid, sebacic acid or azelaic acid while the aromatic dicarboxylic acid is terephthalic acid or naphthalene dicarboxylic acid. The dihydroxy compound is typically 1,4-butanediol.

The polyesters are usually made from fossil-based carbon sources i.e. petroleum-based monomers. However portions of the polyester, such as 1,4-butanediol or adipic acid, can also be made from biomass or other renewable sources of carbon. For the synthesis of polybutylene adipate terephthalate (PBAT), 1,4-butanediol is the dihydroxy compound, and the dicarboxylic acids are adipic and terephthalic acid. Commercial examples of PBAT include for example ECOFLEX® (BASF) and Eastar BIO® (Novamont). Ecoflex has a melt temperature ($T_m$) of about 110° C. to about 120° C., as measured by differential scanning calorimetry (DSC). PBAT is a flexible, tough polymer but which does not biodegrade very quickly in all types of environments as compared to PHA's for example. When combined with PHA's, the biodegradation rate of PBAT can be improved significantly. The toughness properties of PBAT can be further improved by blending with highly amorphous PHA's followed by reactive extrusion into film products.

Blends

In certain embodiments, the polymers for use in the methods and compositions are blended in the presence of additives (e.g., nucleating agent(s), compatibilizer(s), anti-slip additive(s) and the like, co-agents and branching agents to form compositions with improved toughness properties. The percentages of PBS or PBAT in the blend are 50% to 95% by weight, for example 70-95%. In certain compositions of the invention, the percentages of 3-hydroxybutyrate (3HB) copolymer of the total polymer compositions ranges from about 95% 3-hydroxybutyrate (3HB) copolymer to about 5% 3-hydroxybutyrate (3HB) copolymer or about 50% 3-hydroxybutyrate (3HB) copolymer to about 50% PBS or PBAT. For example the PBS or PBAT/3-hydroxybutyrate (3HB) copolymer ratio can be 95/5, 90/10, 85/15, 80/20, 75/25, 70/30, 65/35, 60/40, 55/45 or 50/50.

Branched Compositions

The term "branched polymer" refers to a composition of the invention with branching of the chain and/or cross-linking of two or more chains. Branching on side chains is also contemplated. Branching can be accomplished by various methods. The polymer blends described above can be branched by branching agents by free-radical-induced cross-linking of the polymer. Polyhydroxyalkanoate polymers can be branched in any of the ways described in U.S. Pat. Nos. 6,620,869, 7,208,535, 6,201,083, 6,156,852, 6,248,862, 6,201,083 and 6,096,810 all of which are incorporated herein by reference in their entirety.

The polymers of the invention can also be branched according to any of the methods disclosed in International Publication No. WO 2010/008447, titled "Methods For Branching PHA Using Thermolysis" or International Publication No. WO 2010/008445, titled "Branched PHA Compositions, Methods For Their Production, And Use In Applications," both of which were published in English on Jan. 21, 2010, and designated the United States. These applications are incorporated by reference herein in their entirety.

Branching Agents

The branching agents, also referred to as free radical initiators, for use in the compositions and method described herein include organic peroxides. Peroxides are reactive molecules, and react with polymer molecules or previously branched polymers by removing a hydrogen atom from the polymer backbone, leaving behind a radical. Polymer molecules having such radicals on their backbone are free to combine with each other, creating branched polymer molecules. Branching agents are selected from any suitable initiator known in the art, such as peroxides, azo-dervatives (e.g., azo-nitriles), peresters, and peroxycarbonates. Suitable peroxides for use in the present invention include, but are not limited to, organic peroxides, for example dialkyl organic peroxides such as 2,5-dimethyl-2,5-di(t-butylperoxy) hexane, 2,5-dimethyl-2,5-di(t-amylperoxy) hexane, 2,5-bis(t-butylperoxy)-2,5-dimethylhexane (available from Akzo Nobel as TRIGANOX® 101), 2,5-dimethyl-di(t-butylperoxy)hexyne-3, di-t-butyl peroxide, dicumyl peroxide, benzoyl peroxide, di-t-amyl peroxide, t-amylperoxy-2-ethylhexylcarbonate (TAEC), t-butyl cumyl peroxide, n-butyl-4,4-bis(t-butylperoxy)valerate, 1,1-di(t-butylperoxy)-3,3,5-trimethyl-cyclohexane, 1,1-bis(t-butylperoxy)-3,3,5-trimethylcyclohexane (CPK), 1,1-di(t-butylperoxy) cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)

butyrate, t-butylperoxy-acetate, t-amylperoxyacetate, t-butylperoxybenzoate, t-amylperoxybenzoate, di-t-butyldiperoxyphthalate, and the like. Combinations and mixtures of peroxides can also be used. Examples of free radical initiators include those mentioned herein, as well as those described in, e.g., *Polymer Handbook*, $3^{rd}$ Ed., J. Brandrup & E. H. Immergut, John Wiley and Sons, 1989, Ch. 2. Irradiation (e.g., e-beam or gamma irradiation) can also be used to generate polymer branching.

As discussed above, when peroxides decompose, they form very high energy radicals that can extract a hydrogen atom from the polymer backbone. These radicals have short half-lives, thereby limiting the population of branched molecules that is produced during the active time period.

Additives

In certain embodiments, various additives are added to the compositions. Examples of these additives include, but are not limited to, antioxidants, pigments, compatibilizers, thermal and UV stabilizers, inorganic and organic fillers, plasticizers, nucleating agents, anti-slip agents, anti-blocking agents and radical scavengers. Additionally, polyfunctional co-agents such as divinyl benzene, triallyl cyanurate and the like may be added. Such co-agents can be added to one or more of these additives for easier incorporation into the polymer. For instance, the co-agent can be mixed with a plasticizer, e.g., a non-reactive plasticizer, e.g., a citric acid ester, and then compounded with the polymer under conditions to induce branching. Other co-agents useful in the compositions of invention, for example, compositions of the first, second, third or fourth aspect are hyperbranched or dendritic polyesters, such as dendrtic and hyperbranched acrylates those sold by Sartomer, e.g., BOLTRON™ H20 acrylate.

In poly-3-hydroxybutyrate copolymer compositions for use in the methods and compositions described herein, for example, plasticizers are often used to change the glass transition temperature and modulus of the composition, but surfactants may also be used. Lubricants may also be used, e.g., in injection molding applications. Plasticizers, surfactants and lubricants may all therefore be included in the overall composition.

In other embodiments, the compositions and methods of the invention include one or more plasticizers. Examples of plasticizers include phthalic compounds (including, but not limited to, dimethyl phthalate, diethyl phthalate, dibutyl phthalate, dihexyl phthalate, di-n-octyl phthalate, di-2-ethyl-hexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate), phosphoric compounds (including, but not limited to, tricresyl phosphate, trioctyl phosphate, triphenyl phosphate, octyl diphenyl phosphate, cresyl diphenyl phosphate, and trichloroethyl phosphate), adipic compounds (including, but not limited to, dibutoxyethoxyethyl adipate (DBEEA), dioctyl adipate, diisooctyl adipate, di-n-octyl adipate, didecyl adipate, diisodecyl adipate, n-octyl n-decyl adipate, n-heptyl adipate, and n-nonyl adipate), sebacic compounds (including, but not limited to, dibutyl sebacate, dioctyl sebacate, diisooctyl sebacate, and butyl benzyl sebacate), azelaic compounds, citric compounds (including, but not limited to, triethyl citrate, acetyl triethyl citrate, tributyl citrate, acetyl tributyl citrate, and acetyl trioctyl citrate), glycolic compounds (including, but not limited to, methyl phthalyl ethyl glycolate, ethyl phthalyl ethyl glycolate, and butyl phthalyl ethyl glycolate), trimellitic compounds (including, but not limited to, trioctyl trimellitate and tri-n-octyl n-decyl trimellitate), phthalic isomer compounds (including, but not limited to, dioctyl isophthalate and dioctyl terephthalate), ricinoleic compounds (including, but not limited to, methyl acetyl, recinoleate and butyl acetyl recinoleate), polyester compounds (including, but not limited to reaction products of diols selected from butane diol, ethylene glycol, propane 1,2-diol, propane 1,3-diol, polyethylene glycol, glycerol, diacids selected from adipic acid, succinic acid, succinic anhydride and hydroxyacids such as hydroxystearic acid, epoxidized soy bean oil, chlorinated paraffins, chlorinated fatty acid esters, fatty acid compounds, plant oils, pigments, and acrylic compounds. The plasticizers may be used either alone respectively or in combinations with each other. Addition of plasticizers in the blend formulation can increase the biodegradation rate of the composition.

In certain embodiments, the compositions and methods of the invention include one or more surfactants. Surfactants are generally used to de-dust, lubricate, reduce surface tension, and/or densify. Examples of surfactants include, but are not limited to mineral oil, castor oil, and soybean oil. One mineral oil surfactant is Drakeol 34, available from Penreco (Dickinson, Tex., USA). Maxsperse W-6000 and W-3000 solid surfactants are available from Chemax Polymer Additives (Piedmont, S.C., USA). Non-ionic surfactants with HLB values ranging from about 2 to about 16 can be used, examples being TWEEN-20, TWEEN-65, Span-40 and Span 85.

Anionic surfactants include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-beta-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (alpha-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate.

One or more lubricants can also be added to the compositions and methods of the invention. Lubricants are normally used to reduce sticking to hot processing metal surfaces and can include polyethylene, paraffin oils, and paraffin waxes in combination with metal stearates. Other lubricants include stearic acid, amide waxes, ester waxes, metal carboxylates, and carboxylic acids. Lubricants are normally added to polymers in the range of about 0.1 percent to about 1 percent by weight, generally from about 0.7 percent to about 0.8 percent by weight of the compound. Solid lubricants are warmed and melted before or during processing of the blend.

In film applications of the compositions and methods described herein, anti-block masterbatch is also added. A suitable example is a slip anti-block masterbatch mixture of erucamide (20% by weight) diatomaceous earth (15% by weight) nucleant masterbatch (3% by weight), pelleted into PHA (62% by weight). Others are known to those of ordinary skill in the field of polymer processing.

Cross-Linking Agents

Cross-linking agents, also referred to as co-agents, used in the methods and compositions of the invention are cross-linking agents comprising two or more reactive functional groups such as epoxides or double bonds. These cross-linking agents modify the properties of the polymer. These properties include, but are not limited to, melt strength or toughness. One type of cross-linking agent is an "epoxy functional compound." As used herein, "epoxy functional compound" is meant to include compounds with two or more epoxide groups capable of increasing the melt strength of polyhydroxyalkanoate polymers by branching, e.g., end branching as described above.

When an epoxy functional compound is used as the cross-linking agent in the disclosed methods, a branching agent is optional. As such one embodiment of the invention is a method of branching a starting polyhydroxyalkanoate polymer (PHA), comprising reacting a starting PHA with an epoxy functional compound. Alternatively, the invention is a method of branching a starting polyhydroxyalkanoate polymer, comprising reacting a starting PHA, a branching agent and an epoxy functional compound. Alternatively, the invention is a method of branching a starting polyhydroxyalkanoate polymer, comprising reacting a starting PHA, and an epoxy functional compound in the absence of a branching agent. Such epoxy functional compounds can include epoxy-functional, styrene-acrylic polymers (such as, but not limited to, e.g., JONCRYL® ADR-4368 (BASF), or MP-40 (Kaneka)), acrylic and/or polyolefin copolymers and oligomers containing glycidyl groups incorporated as side chains (such as, but not limited to, e.g., LOTADER® (Arkema), poly(ethylene-glycidyl methacrylate-co-methacrylate)), and epoxidized oils (such as, but not limited to, e.g., epoxidized soybean, olive, linseed, palm, peanut, coconut, seaweed, cod liver oils, or mixtures thereof, e.g., Merginat ESBO (Hobum, Hamburg, Germany) and EDENOL® B 316 (Cognis, Dusseldorf, Germany)).

For example, reactive acrylics or functional acrylics cross-linking agents are used to increase the molecular weight of the polymer in the branched polymer compositions described herein. Such cross-linking agents are sold commercially. BASF, for instance, sells multiple compounds under the trade name "JONCRYL®," which are described in U.S. Pat. No. 6,984,694 to Blasius et al., "Oligomeric chain extenders for processing, post-processing and recycling of condensation polymers, synthesis, compositions and applications," incorporated herein by reference in its entirety. One such compound is JONCRYL® ADR-4368CS, which is styrene glycidyl methacrylate and is discussed below. Another is MP-40 (Kaneka). And still another is the Petra line from Honeywell, see for example, U.S. Pat. No. 5,723,730. Such polymers are often used in plastic recycling (e.g., in recycling of polyethylene terephthalate) to increase the molecular weight (or to mimic the increase of molecular weight) of the polymer being recycled. Such polymers often have the general structure:

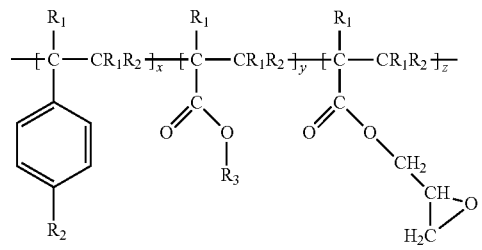

$R_1$ and $R_2$ are H or alkyl
$R_3$ is alkyl
x and y are 1-20
z is 2-20

E.I. du Pont de Nemours & Company sells multiple reactive compounds under the trade name ELVALOY®, which are ethylene copolymers, such as acrylate copolymers, elastomeric terpolymers, and other copolymers. One such compound is ELVALOY® PTW, which is a copolymer of ethylene-n-butyl acrylate and glycidyl methacrylate. Omnova sells similar compounds under the trade names "SX64053," "SX64055," and "SX64056." Other entities also supply such compounds commercially.

Specific polyfunctional polymeric compounds with reactive epoxy functional groups are the styrene-acrylic copolymers. These materials are based on oligomers with styrene and acrylate building blocks that have glycidyl groups incorporated as side chains. A high number of epoxy groups per oligomer chain are used, for example 5, greater than 10, or greater than 20. These polymeric materials generally have a molecular weight greater than 3000, specifically greater than 4000, and more specifically greater than 6000. These are commercially available from S.C. Johnson Polymer, LLC (now owned by BASF) under the trade name JONCRYL®, ADR 4368 material. Other types of polyfunctional polymer materials with multiple epoxy groups are acrylic and/or polyolefin copolymers and oligomers containing glycidyl groups incorporated as side chains. A further example of such a polyfunctional carboxy-reactive material is a co- or ter-polymer including units of ethylene and glycidyl methacrylate (GMA), available under the trade name LOTADER® resin, sold by Arkema. These materials can further comprise methacrylate units that are not glycidyl. An example of this type is poly(ethylene-glycidyl methacrylate-co-methacrylate).

Fatty acid esters or naturally occurring oils containing epoxy groups (epoxidized) can also be used. Examples of naturally occurring oils are olive oil, linseed oil, soybean oil, palm oil, peanut oil, coconut oil, seaweed oil, cod liver oil, or a mixture of these compounds. Particular preference is given to epoxidized soybean oil (e.g., Merginat ESBO from Hobum, Hamburg, or EDENOL® B 316 from Cognis, Dusseldorf), but others may also be used.

Another type of cross-linking agent are agents with two or more double bonds. Cross-linking agents with two or more double bond cross-link PHAs by after reacting at the double bonds. Examples of these include: diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate.

In general, it appears that compounds with terminal epoxides perform better than those with epoxide groups located elsewhere on the molecule.

Compounds having a relatively high number of end groups are the most desirable. Molecular weight may also play a role in this regard, and compounds with higher numbers of end groups relative to their molecular weight (e.g., the JONCRYL®s are in the 3000-4000 g/mol range) are likely to perform better than compounds with fewer end groups relative to their molecular weight (e.g., the Omnova products have molecular weights in the 100,000-800,000 g/mol range).

Nucleating Agents

If desired, an optional nucleating agent is added to the compositions of the invention to aid in its crystallization. In certain embodiments, the nucleating agent aids in the crystallization of the compositions. Nucleating agents for various polymers are simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, metal salts of organophosphates, and boron nitride; low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester; high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride; high-molecular organic compounds, for example: alpha-olefins branched at their 3-position carbon atom and having no fewer than 5 carbon atoms, such as 3,3 dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers; phosphoric or phosphorous acid and its metal salts, such as diphenyl phosphate, diphenyl phosphite, metal salts of bis(4-tert-butylphenyl) phosphate, and methylene bis-(2,4-tert-butylphenyl)phosphate; sorbitol derivatives such as bis(p-methylbenzylidene)sorbitol and bis(p-ethylbenzylidene)sorbitol; and thioglycolic anhydride, p-toluenesulfonic acid and its metal salts. The above nucleating agents may be used either alone or in combinations with each other. In particular embodiments, the nucleating agent is cyanuric acid. In certain embodiments, the nucleating agent can also be another polymer (e.g., polymeric nucleating agents such as PHB).

In certain embodiments, the nucleating agent is selected from: cyanuric acid, carbon black, mica talc, silica, boron nitride, clay, calcium carbonate, synthesized silicic acid and salts, metal salts of organophosphates, and kaolin. In particular embodiments, the nucleating agent is cyanuric acid.

In various embodiments, where the nucleating agent is dispersed in a liquid carrier, the liquid carrier is a plasticizer, e.g., a citric compound or an adipic compound, e.g., acetylcitrate tributyrate (CITROFLEX® A4, Vertellus, Inc., High Point, N.C.), or DBEEA (dibutoxyethoxyethyl adipate), a surfactant, e.g., Triton X-100, TWEEN-20, TWEEN-65, Span-40 or Span 85, a lubricant, a volatile liquid, e.g., chloroform, heptane, or pentane, a organic liquid or water.

In other embodiments, the nucleating agent is aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole.

In particular embodiments, the nucleating agent can include aluminum hydroxy diphosphate or a compound comprising a nitrogen-containing heteroaromatic core. The nitrogen-containing heteroaromatic core is pyridine, pyrimidine, pyrazine, pyridazine, triazine, or imidazole. The nucleant can have a chemical formula selected from the group consisting of

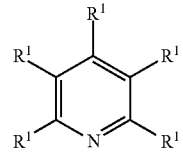

Formula 1

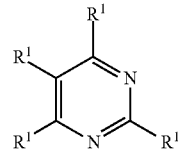

Formula 2

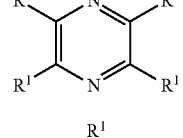

Formula 3

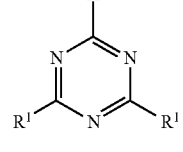

Formula 4

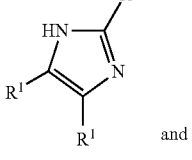

Formula 5 and

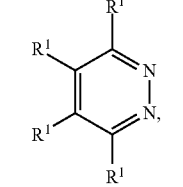

Formula 6 and combinations thereof, wherein each R1 is independently H, $NR^2R^2$, $OR^2$, $SR^2$, $SOR^2$, $SO_2R^2$, CN, $COR^2$, $CO_2R^2$, $CONR^2R^2$, $NO_2$, F, Cl, Br, or I; and each $R^2$ is independently H or $C_1$-$C_6$ alkyl.

The nucleating agent can be a nucleating agent as described in U.S. Published Application No. US 2005/0209377, by Allen Padwa, which is herein incorporated by reference in its entirety.

Another nucleating agent for use in the compositions and methods described herein are milled as described in International Publication No. WO 2009/129499, published in English on Oct. 22, 2009, and which designates the United States, which is herein incorporated by reference in its entirety. Briefly, the nucleating agent is milled in a liquid carrier until at least 5% of the cumulative solid volume of the nucleating agent exists as particles with a particle size of 5 microns or less. The liquid carrier allows the nucleating agent to be wet milled. In other embodiments, the nucleating agent is milled in liquid carrier until at least 10% of the cumulative solid volume, at least 20% of the cumulative solid volume, at least 30% or at least 40%-50% of the nucleating agent can exist as particles with a particle size of 5 microns or less, 2 microns or less or 1 micron or less. In alternative embodiments, the nucleating agents is milled by other methods, such as jet milling and the like. Additionally, other methods is utilized that reduce the particle size.

The cumulative solid volume of particles is the combined volume of the particles in dry form in the absence of any other substance. The cumulative solid volume of the particles is determined by determining the volume of the particles before dispersing them in a polymer or liquid carrier by, for example, pouring them dry into a graduated cylinder or other suitable device for measuring volume. Alternatively, cumulative solid volume is determined by light scattering.

Application of the Compositions

For the fabrication of useful articles, the compositions described herein are processed preferably at a temperature above the crystalline melting point of the polymers but below the decomposition point of any of the ingredients (e.g., the additives described above, with the exception of some branching agents) of the polymeric composition. While in heat plasticized condition, the polymeric composition is processed into a desired shape, and subsequently cooled to set the shape and induce crystallization. Such shapes can include, but are not limited to, a fiber, filament, film, sheet, rod, tube, bottle, or other shape. Such processing is performed using any art-known technique, such as, but not limited to, extrusion, injection molding, compression molding, blowing or blow molding (e.g., blown film, blowing of foam), calendaring, rotational molding, casting (e.g., cast sheet, cast film), or thermoforming. Thermoforming is a process that uses films or sheets of thermoplastic. The polymeric composition is processed into a film or sheet. The sheet of polymer is then placed in an oven and heated. When soft enough to be formed it is transferred to a mold and formed into a shape.

During thermoforming, when the softening point of a semi-crystalline polymer is reached, the polymer sheet begins to sag. The window between softening and droop is usually narrow. It can therefore be difficult to move the softened polymer sheet to the mold quickly enough. Branching the polymer can be used to increase the melt strength of the polymer so that the sheet maintains is more readily processed and maintains its structural integrity. Measuring the sag of a sample piece of polymer when it is heated is therefore a way to measure the relative size of this processing window for thermoforming.

The compositions described herein can be processed into films of varying thickness, for example, films of uniform thickness ranging from 1-200 microns, for example, 10-75 microns, 75 to 150 microns, or from 50-100 microns. Film layers can additionally be stacked to form multilayer films of the same or varying thicknesses or compositions of the same or varying compositions.

Blow molding, which is similar to thermoforming and is used to produce deep draw products such as bottles and similar products with deep interiors, also benefits from the increased elasticity and melt strength and reduced sag of the polymer compositions described herein.

Articles made from the compositions can be annealed according to any of the methods disclosed in International Publication No. WO 2010/008445, which was published in English on Jan. 21, 2010, and designated the United States, and is titled "Branched PHA Compositions, Methods For Their Production, And Use In Applications," which was filed in English and designated the United States. This application is incorporated by reference herein in their entirety.

As disclosed herein, "annealing" and "heat treatment" means a treatment where the polymer composition processed to a product in nonliquid form is subsequently (i.e., after the film is formed) heated for a period of time. This has been found to provide surprising and unexpected properties of puncture toughness and tear resistance in the films comprising the compositions of the invention. Preferably the flat film is heated to about 80° C. to about 140° C. for about 5 seconds to about 90 minutes, more preferably to about 90° C. to about 130° C. for about 10 minutes to about 70 minutes, and most preferably to about 110° C. to about 125° C. for about 15 minutes to about 60 minutes.

The compositions described herein are provided in any suitable form convenient for an intended application. For example, the composition is provided in pellet for subsequent production of films, coatings, moldings or other articles, or the films, coatings, moldings and other articles.

The polymeric compositions of the present invention can be used to create, without limitation, a wide variety of useful products, e.g., automotive, consumer durable, consumer disposable, construction, electrical, medical, and packaging products. For instance, the polymeric compositions can be used to make, without limitation, films (e.g., packaging films, agricultural film, mulch film, erosion control, hay bale wrap, slit film, food wrap, pallet wrap, protective automobile and appliance wrap, etc.), bags (e.g., trash bags, grocery bags, food bags, compost bags, etc.), hygiene articles (e.g., diapers, feminine hygiene products, incontinence products, disposable wipes, etc.), coatings for pelleted products (e.g., pelleted fertilizer, herbicides, pesticides, seeds, etc.), packaging (including, but not limited to, packaging and containers for food and beverage products, cosmetic products, detergents and cleaning products, personal care products, pharmaceutical and wellness products), golf tees, caps and closures, agricultural supports and stakes, paper and board coatings (e.g., for cups, plates, boxes, etc.), thermoformed products (e.g., trays, containers, yoghurt pots, plant pots, noodle bowls, moldings, etc.), housings (e.g., for electronics items, e.g., cell phones, PDA cases, music player cases, computer cases, printers, calculators, LCD projectors, connectors, chip trays, circuit breakers, plugs, and the like), wire and cable products (including, but not limited to, wire, cable and coatings for wire and cable for vehicles, cars, trucks, airplanes, aerospace, construction, military, telecommunication, utility power, alternative energy, and electronics), industrial products (such as, but not limited to, containers, bottles, drums, materials handling, gears, bearings, gaskets and seals, valves, wind turbines, and safety equipment), products for transportation (such as, but not limited to, automotive aftermarket parts, bumpers, window seals, instrument panels, consoles, under hood electrical parts, and engine covers), appliances and appliance parts (such as, but not limited to, refrigerators, freezers, washers, dryers, toasters, blenders, vacuum cleaners, coffee makers, and mixers), articles for use in building and construction (such as, but not limited to, fences, decks and rails, floors, floor covering, pipes and fittings, siding, trim, windows, doors, molding, and wall coverings), consumer goods and parts for consumer goods (such as, but not limited to, power hand tools, rakes, shovels, lawn mowers, shoes, boots, golf clubs, fishing poles, and watercraft), healthcare equipment (including, but not limited to, wheelchairs, beds, testing equipment, analyzers, labware, ostomy, IV sets, wound care, drug delivery, inhalers, and packaging). In short, the polymeric products described herein can be used to make the items currently made from conventional petroleum-based polymers.

The specific examples below are to be construed as merely illustrative, and not limitative of the remainder of the disclosure in any way whatsoever. Without further elaboration, it is believed that one skilled in the art can, based on the description herein, utilize the present invention to its fullest extent. All publications cited herein are hereby incorporated by reference in their entirety.

EXAMPLES

Experimental Methods

Measurement of Tensile Properties

The homopolymers and the blends were compression molded from pellets into plaques that were about 0.2 mm in thickness using a mold temperature of 200° C. The pellets were maintained at 200° C. for about one minute in the compression molder before they were quenched to room temperature. The tensile properties of these plaques were then measured on an Instron 3345 according to ASTM D882 at a speed of about 51 mm/min at room temperature. Modulus (MPa) was measured from the slope of the stress-strain curve, tensile elongation was measured as the % change in sample length before breaking, tensile strength (MPa) was measured as the maximum force achieved prior to breaking divided by the sample area (MPa) and the tensile toughness (J) was calculated as the area under the stress-strain curve. Tensile elongation to break and tensile toughness are the indicators that will be used to assess the toughness of the Blend component control (e.g., PBS or PBAT control) and of the various blends.

Measurement of Melt Strength, Elasticity and Viscosity

Melt strength, G', melt viscosity, η*, and melt elasticity were measured using oscillatory torsional rheology. The measurements were performed using a TA Instruments AR2000 rheometer employing a strain amplitude of 1%. First, compounded pellets were compression molded into 25 mm diameter discs that were about 1200 microns in thickness. The disc specimens were molded in a compression molder set at about 165-177° C., with a molding time of about 30 seconds. The molded discs were then placed in between the 25 mm parallel plates of the AR2000 rheometer, equilibrated at 185° C. to ensure complete melting of all PHA blend components, and subsequently cooled to 160° C. prior to a frequency sweep test. A gap distance between the parallel plates of 800-900 µm was used, depending on the normal forces exerted by the polymer. After the final gap distance was set, and excess material from the sides of the platens was scraped off, the specimen was then cooled to 160° C. where a frequency scan from 0.10 rad/s to 625 rad/s was then carried out; frequencies lower than 0.1 rad/s were avoided because of considerable PHA degradation over the long time it takes for these lower frequency measurements.

During the frequency sweep performed at 160° C., the following data was collected as a function of measurement frequency: η* or complex viscosity, G' or elastic modulus (elastic or solid-like contribution to the viscosity) and G" or loss modulus (viscous or liquid-like contribution to the viscosity). For purposes of simplicity, G' measured at an imposed frequency (ω) of 0.25 rad/s as a measure of "melt strength" was used. Higher G' value therefore translated to higher melt strength. Melt elasticity was calculated using the following equation: $ME=(G'/\eta^* \times \omega)$ where ω was 0.25 rad/s. The melt elasticity is a dimensionless number which indicates the relative elasticity of a polymer. The closer the value of the melt elasticity is to 1, the more elastic the polymer.

Measurement of Tear Strength

The Elmendorf resistance to tear propagation was measured according to ASTM D 1922-06. The tear propagation resistance of the film was measured in two directions, along the flow exiting the die ("machine direction tear" or "MD Tear") and also perpendicular to the polymer flow exiting the die ("transverse direction tear" or "TD Tear"). The resistance to tear is reported in units of g/mil film thickness.

Measurement of Impact Resistance (Puncture Resistance)

The impact resistance of the films of the blended polymers of the compositions was measured by the Dart Impact test (ASTM D1709). In this test, a falling weight with a ball end or conical nose is dropped from a predetermined height on a film sample clamped in a holder. The energy required to fail the film is calculated by multiplying the weight of dart times the height. In the examples that follow, the Dart Impact is calculated by dividing the dart weight (g) by the film thickness (mils). This measurement gives an indication of the puncture resistance of the film.

Measurement of PHA Molecular Weight

The absolute weight average molecular weight for the PHA materials was determined by using a flow injection polymer analysis (FIPA) system (TDAmax™, Viscotek Corp, Houston, Tex.). This is a liquid chromatography technique whereby the polymer to be measured is first dissolved in a solvent, filtered and then injected into the FIPA instrument. Once injected, the polymer solution is carried by mobile phase solvent and elutes through a single, low volume size exclusion chromatography column. The column acts to separate the polymer, solvent and any other impurities present in the sample. The detection system consists of a refractive index, light scattering and solution viscosity detectors. The absolute weight average molecular weight of the polymer is determined using the light scattering detector.

To prepare the polymer sample, it was first dissolved in chloroform to a concentration of 2.0 mg/ml at 60° C. After cooling the sample, it was then filtered with a 0.2 micrometer Teflon syringe filter and injected into the instrument. The FIPA unit operated at a temperature of 45° C. with tetrahydrofuran solvent as the mobile phase. The mobile flow rate was 1.0 ml/min. A 100 µl injection volume was used for the analysis of the polymer solution. Once the sample chromatogram was collected, it was the analyzed with the Viscotek Omni-Sec software to determine the absolute weight average molecular weight in units of grams/mole.

Measurement of PHA Composition

The weight percent 4-hydroxybutyrate contained in the PHA copolymers was determined by acid alcoholysis followed by GC-FID analysis. A 10-15 mg sample of the dry copolymer was first weighed in to a test tube. Then 2-5 ml of a reagent containing n-butanol (99%, EMD), 4M HCl in dioxane (Sigma Aldrich) and the internal standard diphenylmethane was pipetted in to the test tube. The test tube was capped and heated at 93° C. for 6 hours using a heater block. After the alcoholysis reaction was completed, the test tube contents were cooled to room temperature and 2-5 ml of DI water was added. The mixture was centrifuged and the organic top layer was pipetted out of the test tube and into a GC vial. The GC vial contents were then run on an Agilent Technologies, Model 6890N, GC-FID System having a ZB-35 30 m×0.25 mm×0.25 µm GC-FID column (Phenomenex). Standards for quantitating the weight %4HB in the copolymer were also prepared using γ-butyrolactone (99%, Sigma Aldrich).

PHA Materials

The PHA polymers utilized in the blend examples along with their weight average molecular weights and compositions are summarized in Table 1. The MIREL® 4100 PHA is a blend of poly-3-hydroxybutyrate homopolymer and two poly-3-hydroxybutyrate-co-4-hydroxybutyrate copolymers giving an overall %4HB content of 12-15%. The SOGREEN® PHA is a single copolymer of poly-3-hydroxybutyrate-co-4-hydroxybutyrate having a high weight average molecular weight (1.538×10$^6$ daltons) and higher %4HB content (~30%).

TABLE 1

Summary of PHA polymers used in the blend examples.
All of the polymers are copolymers of 3-hydroxybutyrate
and 4-hydroxybutyrate except where indicated.

| Polymer ID | $M_w$ | Weight % 4HB | Biobased Content |
|---|---|---|---|
| MIREL ® 4100 | ~650,000 | 12-15% | 85% |
| Tianjin SOGREEN ® 30% 4HB | 1,538,000 | 29.6 | 66% |

Blend Additives

Several additives were also included with the PHA blend formulations used in the examples. They were as follows: CITROFLEX® A4 (Vertellus Specialties Inc.) which is a monomeric citrate butyl ester plasticizer; ACRAWAX® CV (Lonza) is a vegetable-based ethylene-bis-stearamide wax; FILMLINK® 500 (Imerys) is an ultrafine calcium carbonate filler which as a surface coating to prevent agglomeration; TRIGONOX® 131 (Akzo Nobel) is an the organic peroxide tert-amylperoxy 2-ethylhexyl carbonate.

Example 1

Preparation of Reactively Extruded PBS/PHA Blends Using 66% Biobased High Molecular Weight P3HB-4HB Rubber Copolymer In this example blends of rubber P3HB-4HB (Tianjin SOGREEN® 30% 4HB, $T_g$=−20° C.) and PBS were prepared with and without a peroxide branching agent. The PBS used was BIONOLLE® 1001MD (Showa Highpolymer Co.) which is a non-biobased, blown film grade material. The films were all prepared using a 16 mm PRISM twin-screw extruder. The compounding conditions were as follows: extruder temperature profile from inlet to outlet—175° C./175° C./170° C./170° C./165° C./165° C./150° C./150° C.; screw speed RPM ~250. After compounding, each of the formulations was cast into a film for measurement of mechanical properties. Table 2 shows a summary of the formulations prepared and tested as well as the film mechanical properties measured. 100% PBS was added as a control in order to compare the changes in properties upon addition of PHA.

TABLE 2

Summary of PBS/PHA blends data.

| Formulation | 1 | 2 | 3 |
|---|---|---|---|
| PBS (BIONOLLE ® 1001MD) | 100 | 76 | 76 |
| Tianjin SOGREEN ® 30% 4HB | 0 | 15 | 15 |
| CITROFLEX ® A4 | 0 | 4 | 3.95 |
| TRIGONOX ® 131 | 0 | 0 | 0.05 |
| ACRAWAX ® CV | 0 | 0.5 | 0.5 |
| FILMLINK ® 500 CaCO$_3$ | 0 | 4.5 | 4.5 |
| Total (weight %) | 100 | 100 | 100 |
| Cast Film Properties | | | |
| MD* Tear (g/mil) | 7 | 20 | 34 |
| Dart Impact (g/mil) | 68 | >150 | Did not fail |
| MD* Modulus (MPa) | 376 | 291 | 275 |
| MD* Tensile Strength (MPa) | 56 | 54 | 58 |
| MD Tensile Toughness (J) | 1.1 | 1.6 | 1.6 |

*MD = machine direction

Table 2 shows that with the addition of 15% by wt. high molecular weight rubber PHA, the resistance to tear propagation and puncture of the PBS material is improved approximately by a factor of 3. With the addition of the rubber PHA and a branching agent, the tear resistance of the PBS was further improved by a factor of 5. The puncture resistance was not able to be measured as it would not fail under the test conditions used.

Example 2

Preparation of Extruded PBAT/PHA Blends Using 66% Biobased High Molecular Weight P3HB-4HB Rubber Copolymer This example is similar to Example 1 however the PBS was replaced by a non-biobased poly-butylene adipate terephthalate (PBAT, ENPOL® G7070F, Samsung Fine Chemicals). Also no peroxide was used in the formulation. In this example a blend of rubber P3HB-4HB (Tianjin SOGREEN® 30% 4HB, $T_g$=−20° C.) and PBAT were prepared without branching agent. As a comparison, a similar formulation is prepared but with a lower molecular P3HB/P3HB-4HB blend having 12-15% by wt. 4HB (MIREL® M4100 resin). The films were all prepared using a 26 mm twin-screw extruder at a rate of 80 lbs/hr. The compounding conditions were as follows: extruder temperature profile from inlet to outlet 160° C./175° C./170° C./165° C./160° C./140° C./140° C./140° C./140° C./140° C.; screw speed RPM ~350. After compounding, each of the formulations was cast into a film for measurement of mechanical properties. Table 3 shows a summary of the formulations prepared and tested as well as the film mechanical properties measured.

TABLE 3

Summary of PBAT/PHA blend data.

| Formulation | 1 | 2 |
|---|---|---|
| ENPOL ® PBAT | 49 | 49 |
| MIREE ® M4100 (12-15% 4HB) | 30 | 0 |
| J330* | 1 | 1 |
| SOGREEN ® (30% 4HB) | 0 | 25 |
| CITROFLEX ® A4 | 4.5 | 4.5 |
| ACRAWAX ® CV | 0.5 | 0.5 |
| FLMLINK ® 500 CaCO$_3$ | 15 | 20 |
| Total (wt %) | 100 | 100 |

TABLE 3-continued

Summary of PBAT/PHA blend data.

| Formulation | 1 | 2 |
|---|---|---|
| Cast Film Properties | | |
| MD* Tear (g/mil) | 250 | 420 |
| Dart Impact (g/mil) | 150 | 240 |
| MD* Tensile Strength (MPa) | 22 | 17 |
| MD* Tensile Toughness (J) | 0.10 | 0.19 |

*J330 - nucleating agent masterbatch: 33% by wt. NA-1 cyanuric acid in CITROFLEX ® A4

The data in Table 3 shows that the Formulation 2 which was the PBAT blended with the PHA copolymer having high molecular weight and high %4HB content showed much better tear and puncture resistance as compared to the other PBAT/PHA blend. The improvements in tear and puncture resistance however were mitigated by the lowering of the tensile strength. Tensile toughness however improved as well. Formulation 2 was shown to be more applicable for blown film applications due to the better tear and puncture resistance.

Other than in the examples herein, or unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total weight.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. The terms "one," "a," or "an" as used herein are intended to include "at least one" or "one or more," unless otherwise indicated.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

While this invention has been particularly shown and described with references to preferred embodiments thereof, it will be understood by those skilled in the art that various changes in form and details may be made therein without departing from the scope of the invention encompassed by the appended claims.

What is claimed is:

1. A composition, comprising a branched biodegradable polymer blend of:
   a. polybutylene succinate (PBS) or polybutylene-adipate-terephthalate (PBAT) and
   b. a biodegradable polyhydroxyalkanoate (PHA) polymer having a glass transition temperature (Tg) of between about −5° C. and about −50° C. and a molecular weight of between about 600,000 Daltons and about 2,000,000 Daltons, wherein the PHA polymer is a copolymer of:
      i. 3-hydroxybutyrate; and
      ii. One or more monomer selected from 4-hydroxybutyrate, 5-hydroxyvalerate, 3-hydroxyhexanoate and 3-hydroxyoctanoate, wherein the one or more monomers about 25% to about 85% of the weight of the PHA polymer;
   wherein the PHA polymer is between about 3% and about 40% of the weight of the composition.

2. The composition of claim 1, wherein the monomer in the PHA copolymer is 4-hydroxybutyrate or 5-hydroxyvalerate.

3. The composition of claim 1, wherein the copolymer comprises two phases.

4. The composition of claim 1, wherein the renewable carbon content of the blend is at least about 15% by weight, at least 50% by weight, at least 95% by weight, least 97% by weight, at least 98% by weight, at least 99% by weight or is 100% by weight.

5. The composition of claim 1, wherein the renewable carbon content of the poly-3-hydroxybutyrate-co-4-hydroxybutyrate copolymer is a least 85% by weight of the copolymer, least 90% by weight of the copolymer, at least 95% by weight of the copolymer, at least 97% by weight of the copolymer, least 98% by weight of the copolymer, at least 99% by weight of the copolymer or 100% by weight of the copolymer.

6. The composition of claim 2, wherein the content of 4-hydroxybutyrate in the PHA polymer is at least 30 to 50 weight percent.

7. The composition of claim 1, wherein the blend is formed by reactive blending with a branching agent.

8. The composition of claim 7, wherein the branching agent is selected from: dicumyl peroxide, t-amyl-2-ethylhexyl peroxycarbonate, 1,1-bis(t-butylperoxy)-3,3,5-trimethylcyclohexane, 2,5-dimethyl-2,5-di(t-butylperoxy) hexane, 2,5-dimethyl-2,5-di(t-amyl peroxy) hexane, 2,5-bis(t-butylperoxy)-2,5-dimethylhexane, 2,5-dimethyl-di(t-butylperoxy)hexyne-3, di-t-butyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy)propane, ethyl-3,3-di(t-amylperoxy)butyrate, t-butylperoxy-acetate, t-amylperoxyacetate, t-butylperoxybenzoate, t-amylperoxybenzoate, and di-t-butyldiperoxyphthalate or combinations thereof.

9. The composition of claim 7, wherein the composition further comprises a co-agent for reacting with the blend.

10. The composition of claim 9, wherein the co-agent is diallyl phthalate, pentaerythritol tetraacrylate, trimethylolpropane triacrylate, pentaerythritol triacrylate, dipentaerythritol pentaacrylate, diethylene glycol dimethacrylate, bis(2-methacryloxyethyl) phosphate, or combinations thereof.

11. The composition of claim 9, wherein the co-agent is an epoxy-functional styrene-acrylic polymer, an epoxy-functional acrylic copolymer, an epoxy-functional polyolefin copolymer, an oligomer comprising a glycidyl group with an epoxy functional side chain, an epoxy-functional poly(ethylene-glycidyl methacrylate-co-methacrylate), or an epoxidized oil or combinations thereof.

12. The composition of claim 2, wherein the copolymer of 3-hydroxybutyrate (3HB) and 4-hydroxybutyrate (4HB) has a weight % 4HB of about 30% to about 65% in the copolymer, % 4HB of about 30% to about 50% in the copolymer, about 30% to about 45% in the copolymer, about 30% to about 40% in the copolymer, or about 45% to about 65% in the copolymer.

13. A method of preparing a composition comprising a blend of a polybutylene succinate (PBS) or polybutylene-adipate-terephthalate (PBAT) and a copolymer of 3-hydroxybutyrate (3HB) and 4-hydroxybutyrate (4HB), the method comprising melt blending
  a. polybutylene succinate (PBS) or polybutylene-adipate-terephthalate (PBAT), and
  b. a biodegradable copolymer of 3HB and 4HB having a glass transition temperature (Tg) of between about −5° C. and about −50° C. and a molecular weight of between about 600,000 Daltons and about 2,000,000 Daltons,
  wherein the content of 4HB in the copolymer is about 25% to about 85% by weight;
  wherein the content of the copolymer in the blend is between about 3% and about 40% by weight, thereby forming a blend of PBS or PBAT and the copolymer of 3-hydroxybutyrate (3HB) and 4-hydroxybutyrate (4HB),
  wherein the composition has a renewable carbon content of at least about 15% by weight of the composition.

14. A method of preparing a composition comprising a blend of polybutylene succinate (PBS) or polybutylene-adipate-terephthalate (PBAT) and a copolymer of 3-hydroxybutyrate (3HB) and 4-hydroxybutyrate (4HB), the method comprising melt reacting
  a. polybutylene succinate (PBS) or polybutylene-adipate-terephthalate (PBAT) and
  b. a biodegradable copolymer of 3HB and 4HB having a glass transition temperature (Tg) of between about −5° C. and about −50° C. and a molecular weight of between about 600,000 Daltons and about 2,000,000 Daltons,
  wherein the content of the copolymer in the blend is between about 3% and about 40% by weight,
  wherein the composition has improved tensile toughness, melt elasticity, melt strength and pliability, and wherein the composition has a renewable carbon content of at least about 15% by weight of the composition.

15. A film comprising the composition of claim 1.

16. An article comprising the composition of claim 1.

17. The article of claim 16 comprising a foam, woven fibers, nonwoven fibers or a thermoformed part.

18. A composition comprising a branched biodegradable biobased polymer blend of
  i. polybutylene succinate (PBS) or polybutylene-adipate-terephthalate (PBAT) and
  ii. a biobased poly-3-hydroxybutyrate-co-4-hydroxybutyrate copolymer having the content of 4-hydroxybutyrate of about 20% to about 65% by weight and a glass transition temperature of about −5° C. to about −50° C.,
  the composition further comprising a plasticizer in an amount sufficient to increase the biodegradation rate of the composition, and
  wherein the renewable carbon content of the blend is at least 80% by weight.

* * * * *